(12) United States Patent
Nadipally et al.

(10) Patent No.: US 11,425,044 B2
(45) Date of Patent: Aug. 23, 2022

(54) DHCP LAYER 2 RELAY IN VXLAN OVERLAY FABRIC

(71) Applicant: CISCO TECHNOLOGY, INC., San Jose, CA (US)

(72) Inventors: Ramchander R. Nadipally, San Ramon, CA (US); Ajinkya Abhay Chouthai, Milpitas, CA (US); Rajagopal Venkatraman, San Jose, CA (US); Xiangqun Li, Kanata (CA); Rahul Kachalia, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/071,154

(22) Filed: Oct. 15, 2020

(65) Prior Publication Data

US 2022/0124037 A1    Apr. 21, 2022

(51) Int. Cl.
*H04L 47/125* (2022.01)
*H04L 45/74* (2022.01)
(Continued)

(52) U.S. Cl.
CPC ........ *H04L 47/125* (2013.01); *H04L 12/4641* (2013.01); *H04L 41/0866* (2013.01); *H04L 45/74* (2013.01); *H04L 61/2007* (2013.01); *H04L 61/2076* (2013.01); *H04L 2212/00* (2013.01)

(58) Field of Classification Search
CPC .............. H04L 41/0866; H04L 47/125; H04L 12/4641; H04L 45/74; H04L 61/2007; H04L 61/2076
See application file for complete search history.

(56) References Cited

U.S. PATENT DOCUMENTS 8,625,456 B1 * 1/2014 Boden, Jr. ............... 370/254
9,438,475 B1 * 9/2016 Kapadia ............. H04L 61/2015
(Continued)

FOREIGN PATENT DOCUMENTS

CN       102055642 A    5/2011
CN       106254203 B    2/2020

*Primary Examiner* — Dung B Huynh
(74) *Attorney, Agent, or Firm* — Lee & Hayes, P.C.

(57) ABSTRACT

This technology enables a dynamic host configuration protocol ("DHCP") Layer 2 relay in a Virtual Extensible Local Area Network ("VXLAN") overlay fabric. A host device broadcasts a configuration request, such as a DHCP discover, across an Ethernet virtual private network ("EVPN") overlay fabric. The DHCP discover is intercepted by a VXLAN Tunnel End Point ("VTEP") device with Layer 2 bridging functionality. The VTEP device selects a centralized gateway ("CGW") device with Layer 3 relay functionality as a destination for the DHCP discover. The VTEP device encapsulates the DHCP discover with a unicast VXLAN header comprising the media access control ("MAC") address of the CGW device and transmits the encapsulated DHCP discover to the CGW device, resolving the destination address associated with the broadcast. The CGW device transmits the DHCP discover to an Internet Protocol ("IP") address associated with a DHCP server that is external to the EVPN overlay fabric.

16 Claims, 8 Drawing Sheets

(51) Int. Cl.
*H04L 12/46* (2006.01)
*H04L 41/0866* (2022.01)
*H04L 61/5007* (2022.01)
*H04L 61/5076* (2022.01)

(56) References Cited

U.S. PATENT DOCUMENTS

| | | | | |
|---|---|---|---|---|
| 9,485,196 | B1* | 11/2016 | Sankaran | H04L 61/103 |
| 9,497,039 | B2* | 11/2016 | Greenberg | H04L 12/4633 |
| 9,548,965 | B2 | 1/2017 | Wang | |
| 10,097,424 | B2* | 10/2018 | Masuda | H04L 41/22 |
| 10,116,464 | B2* | 10/2018 | Lin | H04L 45/16 |
| 10,282,346 | B1* | 5/2019 | Lue | H04L 67/34 |
| 10,298,416 | B2* | 5/2019 | Ng | H04L 69/324 |
| 10,999,195 | B1* | 5/2021 | Suryanarayana | H04L 12/4641 |
| 2004/0088424 | A1* | 5/2004 | Park | H04L 67/1002 |
| | | | | 709/229 |
| 2005/0097360 | A1* | 5/2005 | Chu | H04L 63/0236 |
| | | | | 726/4 |
| 2005/0169056 | A1* | 8/2005 | Berkman | H04B 3/58 |
| | | | | 365/185.22 |
| 2006/0080728 | A1* | 4/2006 | Wen | H04L 12/2859 |
| | | | | 726/4 |
| 2006/0268765 | A1* | 11/2006 | Bajic | H04W 8/065 |
| | | | | 370/328 |
| 2007/0002833 | A1* | 1/2007 | Bajic | H04L 29/1282 |
| | | | | 370/352 |
| 2008/0281973 | A1* | 11/2008 | Yang | H04L 63/08 |
| | | | | 709/228 |
| 2009/0232498 | A1* | 9/2009 | Tsuge | H04Q 11/0067 |
| | | | | 398/58 |
| 2010/0220611 | A1* | 9/2010 | Zhang | H04L 49/9042 |
| | | | | 370/252 |
| 2010/0223655 | A1* | 9/2010 | Zheng | H04L 63/08 |
| | | | | 726/1 |
| 2011/0029645 | A1* | 2/2011 | Baykal | H04L 61/2046 |
| | | | | 709/221 |
| 2012/0014386 | A1* | 1/2012 | Xiong | H04L 12/4675 |
| | | | | 370/392 |
| 2012/0084840 | A1* | 4/2012 | Higuchi | H04L 63/08 |
| | | | | 726/4 |
| 2012/0166611 | A1* | 6/2012 | Kim | H04L 67/28 |
| | | | | 709/223 |
| 2012/0246282 | A1* | 9/2012 | Oguchi | H04L 12/66 |
| | | | | 709/221 |
| 2012/0311184 | A1* | 12/2012 | Yamada | H04L 61/2061 |
| | | | | 709/245 |
| 2013/0094514 | A1* | 4/2013 | Tan | H04L 12/4641 |
| | | | | 370/395.53 |
| 2013/0107872 | A1* | 5/2013 | Lovett | H04L 12/4645 |
| | | | | 370/352 |
| 2013/0223444 | A1* | 8/2013 | Liljenstolpe | H04L 29/0653 |
| | | | | 370/392 |
| 2014/0204757 | A1* | 7/2014 | Ishizaki | H04W 28/021 |
| | | | | 370/235 |
| 2014/0355416 | A1* | 12/2014 | Keesara | H04L 45/24 |
| | | | | 370/219 |
| 2015/0058968 | A1* | 2/2015 | Wang | H04L 63/1466 |
| | | | | 726/12 |
| 2015/0063360 | A1* | 3/2015 | Thakkar | H04L 49/70 |
| | | | | 370/400 |
| 2015/0106804 | A1* | 4/2015 | Chandrashekhar | H04L 61/103 |
| | | | | 718/1 |
| 2015/0172222 | A1* | 6/2015 | Liao | H04L 49/351 |
| | | | | 370/392 |
| 2015/0281172 | A1* | 10/2015 | He | H04L 61/2015 |
| | | | | 709/222 |
| 2016/0248729 | A1* | 8/2016 | Cui | H04W 36/08 |
| 2016/0294769 | A1* | 10/2016 | Song | H04L 61/106 |
| 2016/0344681 | A1* | 11/2016 | Lambert | H04L 61/2015 |
| 2016/0344687 | A1* | 11/2016 | Rong | H04L 61/2015 |
| 2017/0026387 | A1* | 1/2017 | Vissamsetty | H04L 63/1466 |
| 2017/0104758 | A1* | 4/2017 | Jin | H04L 63/08 |
| 2017/0195220 | A1* | 7/2017 | Sivaraj | H04W 48/16 |
| 2017/0317969 | A1* | 11/2017 | Masurekar | H04L 41/12 |
| 2017/0324664 | A1* | 11/2017 | Xu | H04L 45/245 |
| 2018/0183753 | A1* | 6/2018 | Vemulakonda | H04L 41/0886 |
| 2018/0309685 | A1* | 10/2018 | Srinivasan | H04L 45/04 |
| 2018/0343162 | A1* | 11/2018 | Ohsuga | H04L 41/0663 |
| 2019/0140956 | A1* | 5/2019 | Shen | H04L 47/125 |
| 2019/0245915 | A1* | 8/2019 | Kommula | H04L 47/125 |
| 2020/0044917 | A1* | 2/2020 | Peng | H04L 29/12216 |
| 2020/0163012 | A1* | 5/2020 | Zhu | H04W 12/08 |
| 2020/0274948 | A1* | 8/2020 | Yang | H04L 61/2015 |
| 2021/0036983 | A1* | 2/2021 | Vadde Makkalla | H04L 12/4683 |
| 2021/0344567 | A1* | 11/2021 | Li | H04L 41/12 |

\* cited by examiner

DHCP LAYER 2 RELAY IN VXLAN OVERLAY FABRIC

TECHNICAL FIELD

This disclosure relates to a mechanism to provide dynamic host configuration protocol ("DHCP") relay at the layer 2 level in a Virtual Extensible Local Area Network ("VXLAN") overlay fabric.

BACKGROUND

In a conventional VXLAN overlay fabric with a centralized anycast gateway deployment, the fabric edge devices (or leaf devices) are VXLAN Tunnel End Point ("VTEP") devices (leaf VTEP) with Layer 2 relay functionality. When a host device connects to the overlay fabric and sends a DHCP request, the leaf VTEP devices cannot relay the DHCP request directly to either an eternal DHCP server or to a centralized gateway ("CGW") device because the leaf VTEP devices are Layer 2 devices without a switched virtual interface ("SVI") configuration.

As the leaf VTEP devices do not have a mechanism to directly relay DHCP requests, DHCP requests, such as a DHCP discover, are broadcast to all VTEP devices and host devices behind each of the VTEP devices within the overlay fabric, resulting in a substantial amount of broadcast traffic. In addition to increased network traffic, broadcast DHCP requests present security issues due to DHCP requests being broadcast to all VTEP devices and host devices within the overlay fabric, as opposed to being relayed directly to an external server or a CGW device.

DETAILED DESCRIPTION

Overview

The present technology allows a dynamic host configuration protocol ("DHCP") Layer 2 relay in a Virtual Extensible Local Area Network ("VXLAN") overlay fabric.

A host device broadcasts a configuration request, such as a DHCP discover, across an Ethernet virtual private network ("EVPN") overlay. The DHCP discover is intercepted by a VXLAN Tunnel End Point ("VTEP") device with Layer 2 bridging functionality. The VTEP device selects a centralized gateway ("CGW") device with Layer 3 relay functionality as a destination for the DHCP discover. The VTEP device encapsulates the DHCP discover with a unicast VXLAN header comprising the media access control ("MAC") address of the CGW device and transmits the encapsulated DHCP discover to the CGW device.

The CGW device receives the encapsulated DHCP discover from the VTEP device. The CGW device decapsulates the transmission to retrieve the DHCP discover. The CGW device transmits the DHCP discover to a preconfigured Internet Protocol ("IP") address associated with a DHCP server. The DHCP server is external to the EVPN overlay.

The DHCP server receives the DHCP discover and transmits a DHCP offer comprising an IP address to the host device via the CGW device and the VTEP device. As the host device may receive multiple DHCP offers, the host device broadcasts a DHCP request to accept the offered IP address to the DHCP server via the VTEP device and the CGW device. To complete the configuration process, the DHCP server transmits a DHCP acknowledgement to the host device via the CGW device and the VTEP device.

The present technology allows DHCP Layer 2 relay in a VXLAN overlay fabric. This technology allows the intercepting VTEP device to convert the broadcast DHCP discover to a unicast request and to relay the DHCP discover to a selected CGW device. The present technology reduces broadcast traffic throughout the EVPN overlay as the DHCP discover is converted to a unicast request, thereby eliminating flooding throughout the VTEP and host devices in the EVPN overlay. This technology increases security as information associated with a host device is transmitted directly to a CGW device and DHCP server from a VTEP device without the information being broadcast to all VTEP and host devices within the EVPN overlay.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

Figure 1:
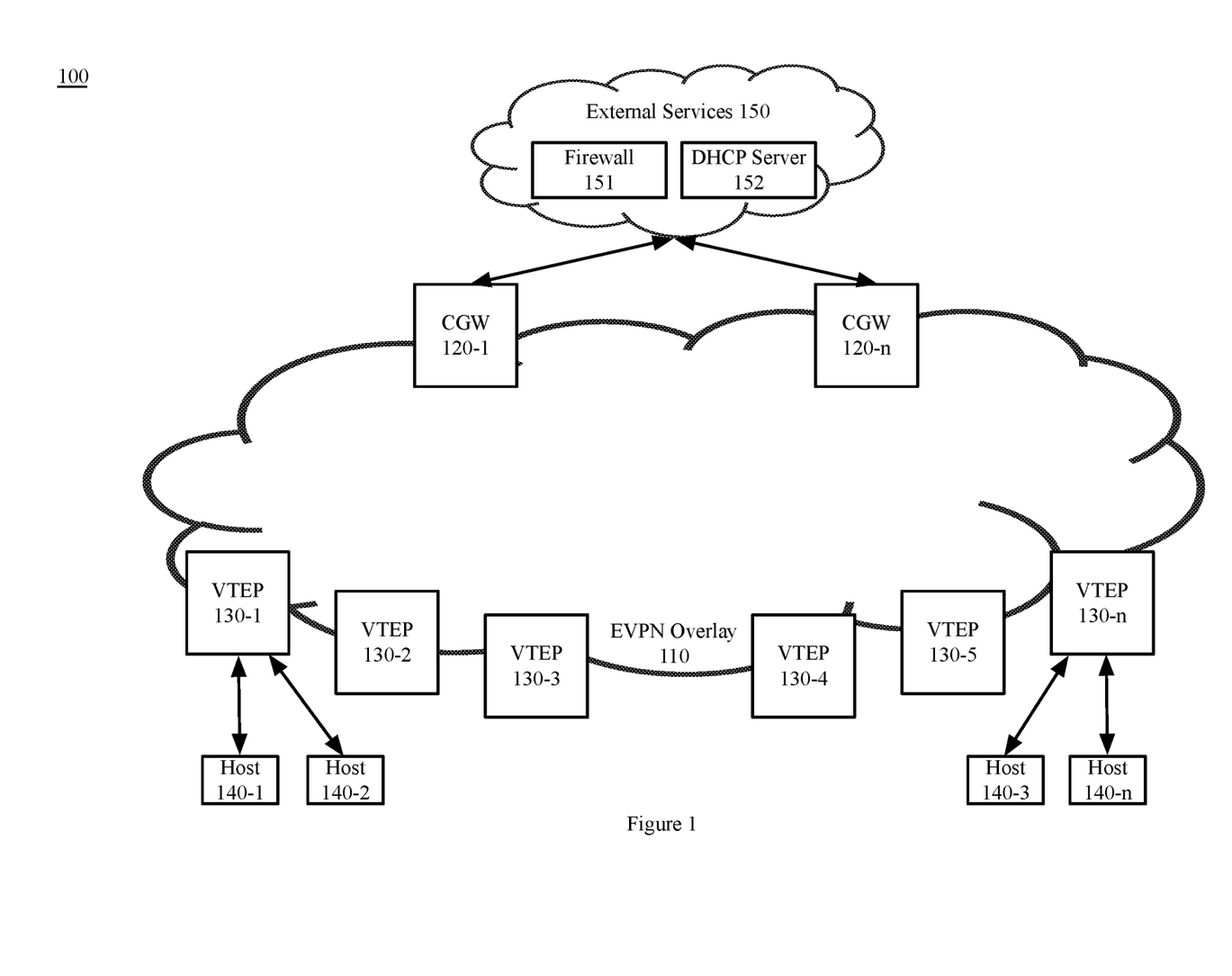
FIG. 1 is a block diagram depicting a network system, in accordance with certain examples.

FIG. 1 is a block diagram depicting a network system 100, in accordance with certain examples. As depicted in FIG. 1, the network system 100 comprises an Ethernet virtual private network ("EVPN") overlay 110, centralized gateway ("CGW") devices 120-1 through 120-n, Virtual Extensible Local Area Network ("VXLAN") Tunnel End Point ("VTEP") devices 130-1 through 130-n, host devices 140-1 through 140-n, and external services 150.

The network system 100 comprises an EVPN overlay 110. The EVPN overlay 110 is a VXLAN fabric overlay. VXLAN is a media access control ("MAC") in Internet Protocol/User Datagram Protocol ("IP/UDP") ("MAC-in-UDP") encapsulation technique with a 24-bit segment identifier ("ID") in the form of a VXLAN ID. VXLAN provides a method to extend Layer 2 networks across Layer 3 infrastructure using MAC-in-UDP encapsulation and tunneling. EVPN is an extension to the VXLAN fabric overlay that enables a border gateway protocol ("BGP") within the overlay. BGP is an Internet Engineering Task Force ("IETF") standard, a routing protocol of the Internet and Service Provider private networks, and routes for Multicast, Internet Protocol version 6 ("IPv6"), Virtual Private Networks ("VPN"), and various other types of data.

The network system 100 comprises one or more CGW devices 120-1 through 120-*n*. The CGW devices 120 are network nodes configured as relay agents that serve as an access point to other parts of the network system 100 or to devices and/or systems external to the network system 100. In an example, each CGW device 120 is a VTEP device to which inter subnet network traffic is routed. In the example, each CGW device 120 has Layer 3 or routing functionality such as asymmetric inter-subnet routing ("IRB") functionality. The use of a CGW deployment model enables policy and firewall enforcement at a central distribution switch for cross subnet traffic, east-west traffic, and north-south traffic.

The network system 100 comprises one or more VTEP devices 130-1 through 130-*n*. The VTEP devices 130 are devices that originate or terminate VXLAN traffic. The VTEP devices are Layer 2 devices with Layer 2 or bridging overlay functionality. There are two primary types of VTEP devices 130: 1) hardware VTEP devices that handle VXLAN packets in hardware and 2) software VTEP devices that handle VXLAN packets in software. The VTEP devices 130 may be virtual bridges, VXLAN aware virtual machine ("VM") applications, VXLAN capable switching hardware, routers, servers, hypervisors, or any other device suitable to originate or terminate VXLAN traffic.

The VTEP devices 130 are used by the EVPN overlay 110 to map end devices, such as host devices 140, to VXLAN segments and perform VXLAN encapsulation and decapsulation. In an example, each VTEP device 130 has two interfaces: a switch interface to support local endpoint communication through bridging, and an IP interface to the transport IP network. The IP interface has a unique IP address that identifies each VTEP device 130 on the transport IP network. Each VTEP device 130 utilizes the IP address to encapsulate Ethernet frames and transmit the encapsulated packets to the transport network. Each VTEP device 130 may also discover remote VTEP devices for the particular VTEP device VXLAN segments and learn remote MAC address-to-VTEP mappings through the IP interface. In an example, VTEP device 130-1 may discover VTEP device 130-4 and learn a MAC address-to-VTEP mapping to VTEP device 130-4.

The network system 100 comprises one or more host devices 140-1 through 140-*n*. A host device 140 is a computer or other device that is connected to the EVPN overlay 110 via a wired or wireless telecommunication mechanism. A host device 140 may function as a server offering information resources, services, and applications to other users or hosts in the EVPN overlay 110, or users or hosts external to EVPN overlay 110. Each host device 140 may be in communication with a VTEP device 130 via a wired or wireless telecommunication mechanism.

The network system 100 may be in communication with an external services system 150. While external services system 150 shown in the architecture is represented by one instance of external services system 150, multiple instances can be used. External services system 150 comprises one or more of a firewall 151, a DHCP server 152, and other network services not depicted such as security services, storage services, and computing resource services.

The external services system 150 comprises a firewall 151, which is a security platform that functions as a barrier or filter for incoming traffic to the external services system 150. The firewall 151 serves to block and mitigate detected threats to external services system 150.

The external services system 150 also comprises a dynamic host configuration protocol ("DHCP") server 152. The DHCP server 152 comprises one or more computing devices and assigns IP addresses, default gateways, and other network configuration parameters to network devices, such as host devices 140. In an example, the DHCP server 152 assigns an IP address to host device 140-1 upon receipt of a DHCP discover from host device 140-1. The DHCP server 152 automatically sends required network parameters to network devices to properly communicate on the network.

Each network system 100 includes a wired or wireless telecommunication mechanism by which network devices (including EVPN overlay 110, devices 120, 130, and 140, and eternal services system 150) can communicate and exchange data. Each network system 100 can include, be implemented as, or may be a part of, a wired or wireless communication network, cloud computing environment, or any other appropriate architecture or system that facilitates the communication of signals, data, and/or messages (generally referred to as data). For example, network system 100 may include one or more of a local area network ("LAN"), a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, a BLUETOOTH® wireless technology connection, a near field communication ("NFC") connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Figure 8:
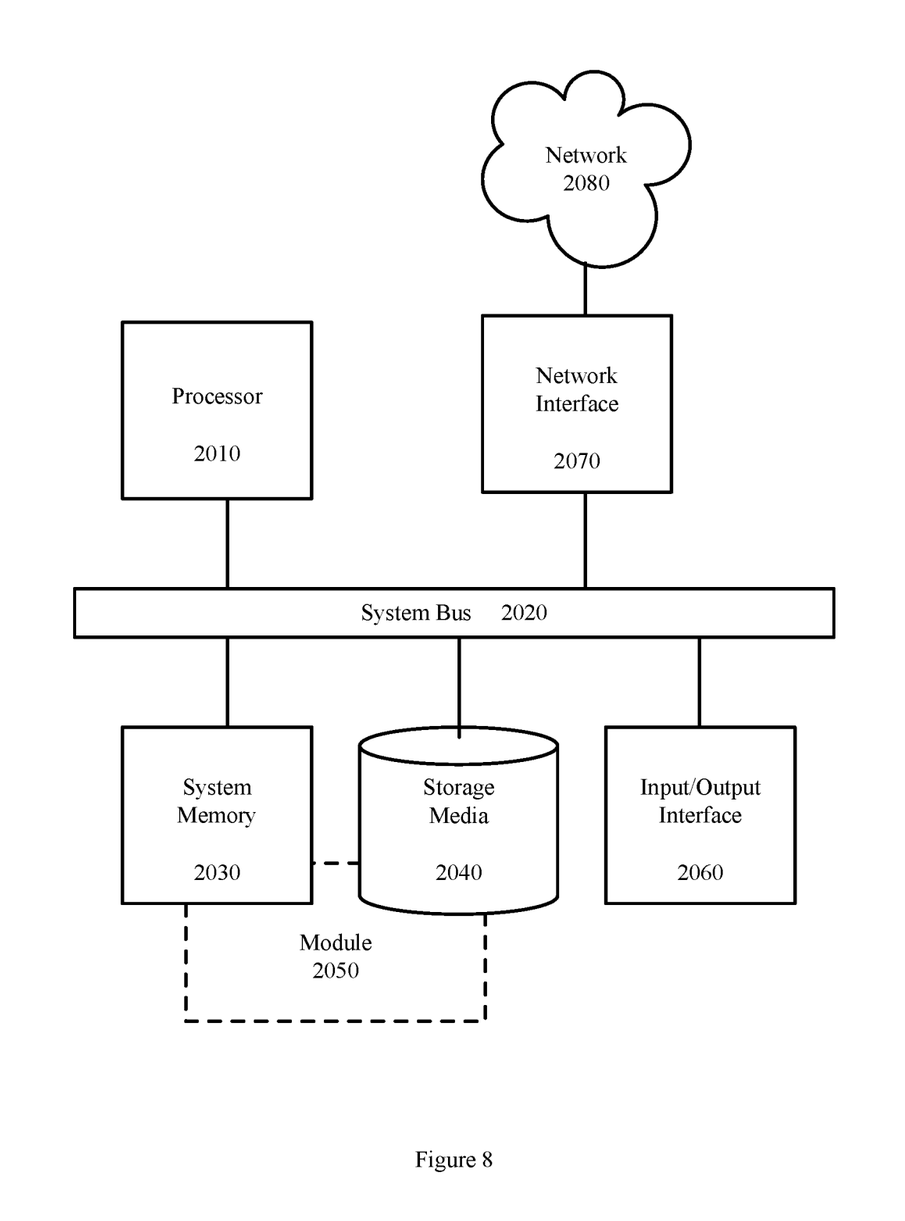
FIG. 8 is a block diagram depicting a computing machine and a module, in accordance with certain examples.

The network computing devices and any other computing machines associated with the technology presented herein may be any type of computing machine, such as, but not limited to, those discussed in more detail with respect to FIG. 8. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks. Each network may include various types of data or communications networks, including any of the network technology discussed with respect to FIG. 8.

Furthermore, any modules associated with any of these computing machines, such as modules described herein or any other modules (scripts, web content, software, firmware, or hardware) associated with the technology presented herein may be any of the modules discussed in more detail with respect to FIG. 8.

The network connections illustrated are examples and other means of establishing a communications link between the computers and devices can be used. Moreover, those having ordinary skill in the art having the benefit of the present disclosure will appreciate that the devices illustrated in FIG. 1 may have any of several other suitable computer system configurations.

Example Processes

The methods illustrated in FIGS. 2-7 are described hereinafter with respect to the components of the network system 100. The methods of FIGS. 2-7 may also be performed with other systems and in other environments. The operations described with respect to FIGS. 2-7 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
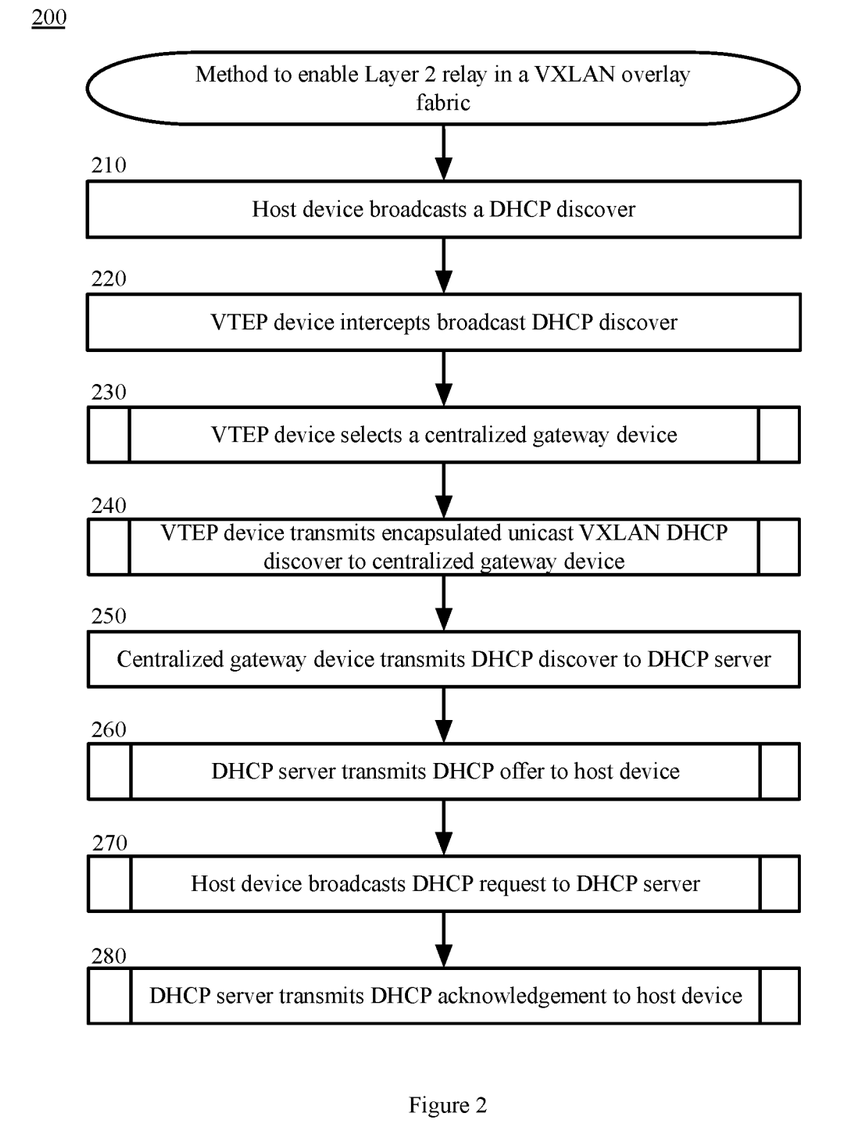
FIG. 2 is a block flow diagram depicting a method to enable Layer 2 relay in a Virtual Extensible Local Area Network overlay fabric, in accordance with certain examples.

FIG. 2 is a block flow diagram depicting a method 200 to enable Layer 2 relay in a Virtual Extensible Local Area Network ("VXLAN") overlay fabric, in accordance with certain examples.

In block 210, a host device 140 broadcasts a dynamic host configuration protocol ("DHCP") discover. The DHCP discover is the first step in a configuration process to provide the host device 140 with configuration parameters, such as an IP address. In an example, the host device 140 may be any of host devices 140-1 through 140-n. A DHCP discover is a broadcast request for an Internet Protocol ("IP") address or other configuration parameters to be provided by a DHCP server. In an example, the DHCP server is DHCP server 152. In an example, the host device 140 utilizes the following addresses in the DHCP discover: source=sender's MAC; destination=FF:FF:FF:FF:FF:FF; IP: source=0.0.0.0; destination=255.255.255.255.

In block 220, a Virtual Extensible Local Area Network ("VXLAN") Tunnel End Point ("VTEP") device 130 intercepts the broadcast DHCP discover. In an example, the VTEP device 130 may be any of VTEP devices 130-1 through 130-n.

In block 230, the VTEP device 130 selects a centralized gateway ("CGW") device 120. Block 230 is described in greater detail herein with reference to the method 230 of FIG. 3.

Figure 3:
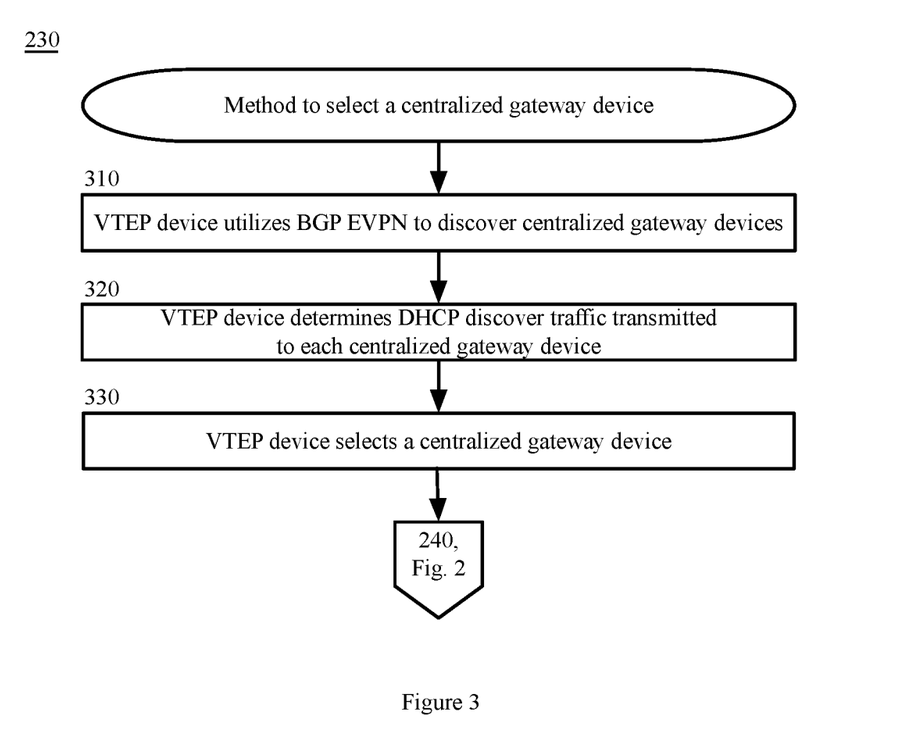
FIG. 3 is a block flow diagram depicting a method to select a centralized gateway device, in accordance with certain examples.

FIG. 3 is a block flow diagram depicting a method 230 to select a centralized gateway device, in accordance with certain examples.

In block 310, VTEP device 130 utilizes a border gateway protocol ("BGP") Ethernet virtual private network ("EVPN") to discover CGW devices 120. BGP EVPN is a control protocol for VXLAN. BGP EVPN utilizes control-plane learning for end hosts behind remote VTEPs. BGP EVPN provides control-plane and data-plane separation and a unified control plane for both Layer 2 and Layer 3 forwarding in an overlay network, such as EVPN overlay 110. The VTEP device 130 uses control plane learning/distribution via BGP to access remote media access control ("MAC") addresses, including the MAC addresses of the CGW devices 120.

In block 320, VTEP device 130 determines DHCP discover traffic transmitted to each centralized gateway device 120. In an example, each VTEP device 130 may log each DHCP discover packet transmitted to each CGW device 120 to determine a volume of DHCP discover traffic to each CGW device 120.

In block 330, VTEP device 130 selects a centralized gateway device 120. In an example, VTEP device 130 uses a hash mechanism to load balance the volume of DHCP discover traffic to each CGW device 120, as determined in block 320. The VTEP device 130 selects a particular CGW device 120, such as CGW device 120-1, with the least volume of DHCP discover traffic. In an alternate example, VTEP device 130 selects a particular CGW device 120 based upon a time of receipt of a DHCP discover packet to distribute network traffic across the CGW devices 120 based on a time of day. In an alternate example, VTEP device 130 sequentially selects a CGW device 120 to distribute network traffic across the CGW devices 120. Any other suitable method may be used to select a CGW device 120.

From block 330, the method 230 returns to block 240 of FIG. 2.

In block 240, VTEP device 130 transmits an encapsulated unicast VXLAN DHCP discover to the centralized gateway device 120. Block 240 is described in greater detail herein with reference to the method 240 of FIG. 4.

Figure 4:
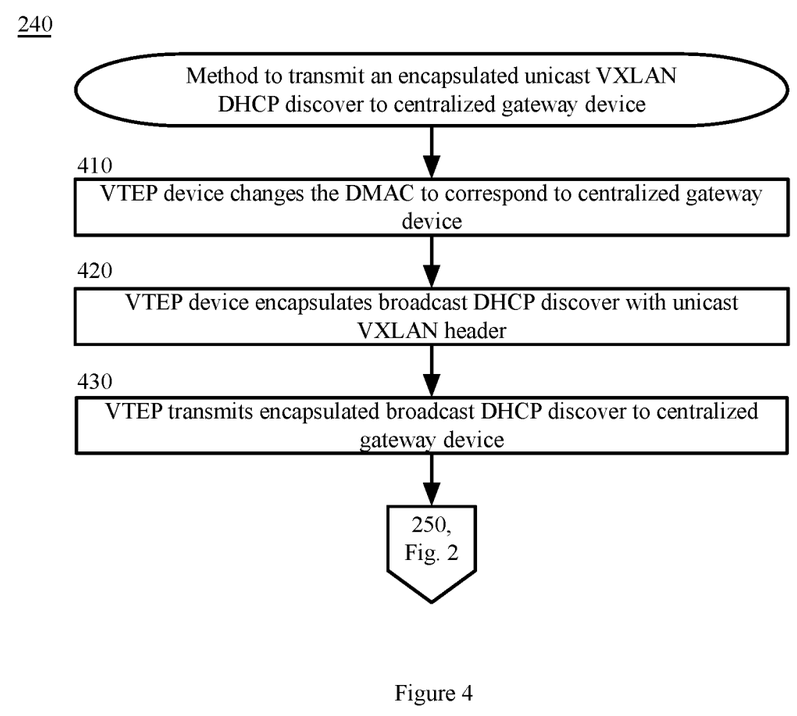
FIG. 4 is a block flow diagram depicting a method to transmit an encapsulated unicast Virtual Extensible Local Area Network dynamic host configuration protocol discover to a centralized gateway device, in accordance with certain examples.

FIG. 4 is a block flow diagram depicting a method 240 to transmit an encapsulated unicast VXLAN DHCP discover to a centralized gateway device 120, in accordance with certain examples.

In block 410, VTEP device 130 changes the destination MAC ("DMAC") to correspond to the centralized gateway device 120. Referring back to block 210 of FIG. 2, the DMAC address from the DHCP discover packet was destination=FF:FF:FF:FF:FF:FF. This DMAC is a broadcast MAC address, which would transmit the DHCP discover to all VTEP devices 130 and host devices 140 within EVPN overlay 110. VTEP device 130 changes the DMAC address of destination=FF:FF:FF:FF:FF:FF to the MAC address of the CGW device 120 selected in method 230 of FIG. 3.

In block 420, VTEP device 130 encapsulates the DHCP discover with a unicast VXLAN header. Encapsulation is the process of placing headers and sometimes trailers around data. In an example, the data is the DHCP discover. The unicast VXLAN header comprises an outer MAC header, wherein the outer MAC header is the MAC associated with the CGW device 120.

In block 430, VTEP device 130 transmits the encapsulated broadcast DHCP discover to the centralized gateway device 120. The VTEP device 130 transmits the encapsulated broadcast DHCP discover to the CGW device 120 utilizing the MAC address associated with the CGW device 120.

From block 430, the method 240 returns to block 250 of FIG. 2. In block 250, the centralized gateway device 120 transmits the DHCP discover to the DHCP server 152. The CGW device 120 decapsulates the DHCP discover to retrieve the broadcast DHCP discover. In an example, the CGW device 120 is configured to transmit the DHCP discover to a DHCP server, such as DHCP server 152. In an example, the CGW 120 is configured using an "ip dhcp relay server" command. In the example, the CGW 120 is configured as follows: host1/Admin(config)# ip dhcp relay enable; host1/Admin(config)# ip dhcp relay server 192.168.20.1, where the IP address 192.168.20.1 corresponds to the IP address of the DHCP server 152. The CGW device 120 may be configured in any suitable method to transmit the DHCP discover to the DHCP server 152.

In block 260, the DHCP server 152 transmits a DHCP offer to host device 140. Block 260 is described in greater detail herein with reference to the method 260 of FIG. 5.

Figure 5:
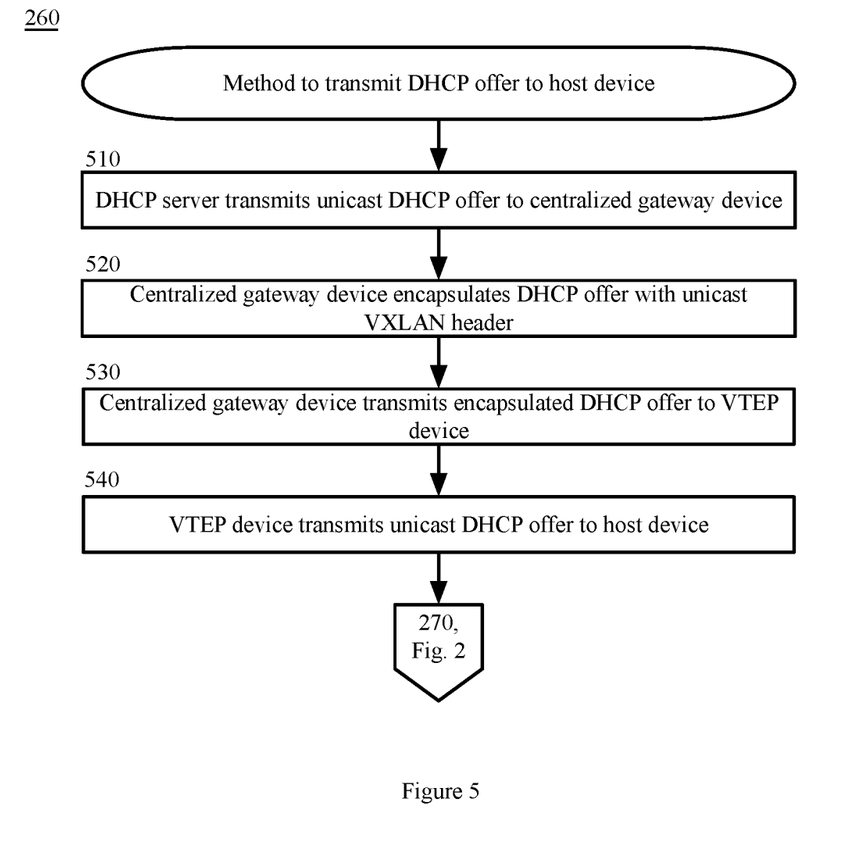
FIG. 5 is a block flow diagram depicting a method to transmit a dynamic host configuration protocol offer to a host device, in accordance with certain examples.

FIG. 5 is a block flow diagram depicting a method 260 to transmit a DHCP offer to a host device 140, in accordance with certain examples.

In block 510, the DHCP server 152 transmits a unicast DHCP offer to centralized gateway device 120. In response to the receipt of the DHCP discover described in reference to block 250 of FIG. 2, the DHCP server 152 generates a DHCP offer message. A DHCP offer message is an offer to provide an IP address to the host device 140 that broadcast the DHCP discover. The DHCP offer message comprises the host device 140 MAC address, the IP address that the DHCP server 152 is offering, and other information including, but not limited to, a subnet mask, a lease duration associated with the offered IP address, and the IP address of the DHCP server 152. In an example, the DHCP server 152 utilizes the following addresses in the DHCP offer: source=sender's MAC; destination=client mac address; IP: source=192.168.20.1; destination=255.255.255.255; YIADDR (Your IP address) 0xC0A80164 (192.168.1.100); SIADDR (Server IP address) 0xC0A80101 (192.168.20.1). In the example, the YIADDR 192.168.1.100 is the IP address offered to the host device 140. The DHCP server 152 transmits the unicast DHCP offer to the IP address associated with the CGW device 120.

In block 520, the centralized gateway device 120 encapsulates the DHCP offer with a unicast VXLAN header. The DHCP offer is encapsulated with a unicast VXLAN header comprising an outer MAC header, wherein the outer MAC header is the MAC associated with the VTEP device 130.

In block 530, the centralized gateway device 120 transmits the encapsulated DHCP offer to the VTEP device 130. The CGW device 120 transmits the encapsulated DHCP offer to the VTEP device 130 utilizing the MAC address associated with the VTEP device 130.

In block 540, the VTEP device 130 transmits the unicast DHCP offer to the host device 140. The VTEP device 130 decapsulates the DHCP offer received from the CGW device 120. The VTEP device 130 transmits the unicast DHCP offer to the MAC address associated with the host device 140 within the DHCP offer. From block 510, the host device 140 MAC address is transmitted with the DHCP offer as "destination=client mac address."

From block 540, the method 260 returns to block 270 of FIG. 2. In block 270, the host device 140 broadcasts a DHCP request to the DHCP server 152. Block 270 is described in greater detail herein with reference to the method 270 of FIG. 6.

Figure 6:
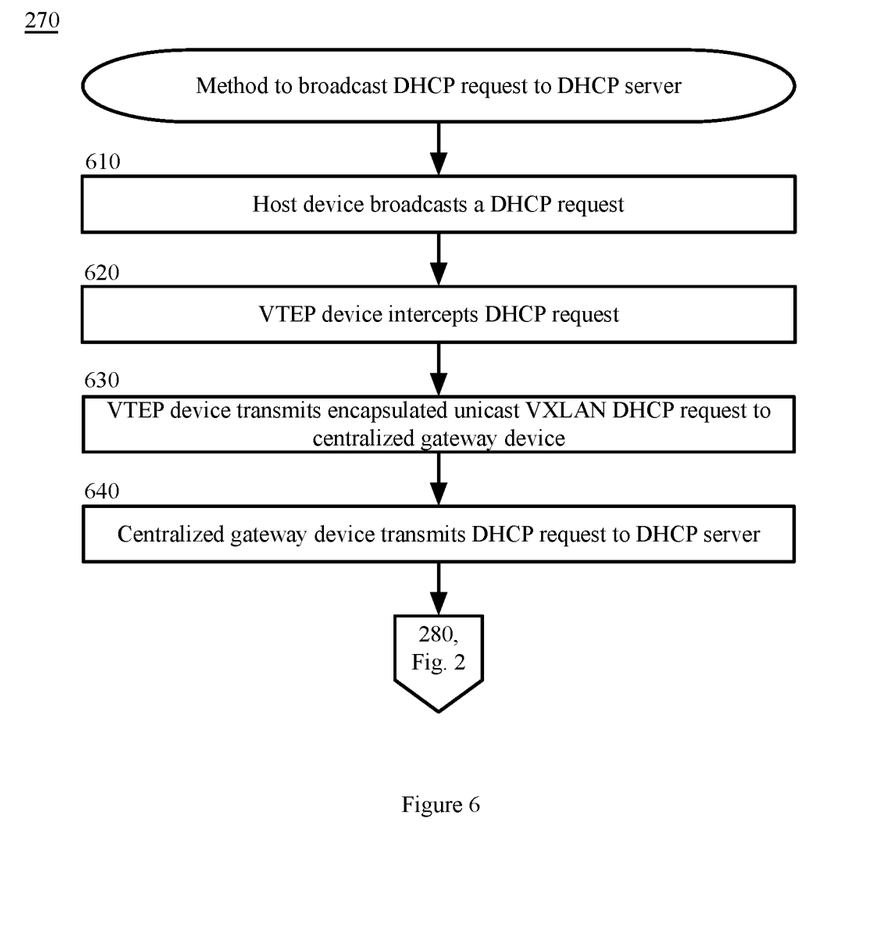
FIG. 6 is a block flow diagram depicting a method to broadcast a dynamic host configuration protocol request to a dynamic host configuration protocol server, in accordance with certain examples.

FIG. 6 is a block flow diagram depicting a method 270 to broadcast a DHCP request to the DHCP server 152, in accordance with certain examples.

In block 610, the host device 140 broadcasts a DHCP request. In response to receiving the DHCP offer in block 540 of FIG. 5, the host device 140 broadcasts a DHCP request message to the DHCP server 152 requesting the offered address. In an example, the host device 140 may receive multiple DHCP offers from DHCP servers other than DHCP server 152. The host device 140 may only accept one DHCP offer. In the continuing example, the host device 140 accepts the DHCP offer from the DHCP server 152. In the example, the host device 140 utilizes the following addresses in the DHCP request: source=sender's MAC; destination=FF:FF:FF:FF:FF:FF; IP: source=0.0.0.0; destination=255.255.255.255, as previously described in reference to block 210 of FIG. 2. The DHCP request also includes the following information: CIADDR (Client IP address) 0xC0A80164 (192.168.1.100); SIADDR (Server IP address) 0xC0A80101 (192.168.20.1). Continuing with the example from block 510 of FIG. 5, the IP address 192.168.1.100 is the address offered to the host device 140 from the DHCP server 152.

In block 620, the VTEP device 130 intercepts the DHCP request.

In block 630, the VTEP device 130 transmits an encapsulated unicast VXLAN DHCP request to the centralized gateway device 120. The VTEP device 130 encapsulates the DHCP request with a unicast VXLAN header. The unicast VXLAN header comprises an outer MAC header, wherein the outer MAC header is the MAC associated with the CGW device 120. In an example, the VTEP device 130 transmits the encapsulated unicast VXLAN DHCP request to the same CGW device 120 selected in block 330 of FIG. 3. In an alternate example, the method 270 returns to method 230 of FIG. 3 and repeats the steps of method 230 to select an alternate CGW device 120.

In block 640, the centralized gateway device 120 transmits the DHCP request to the DHCP server 152. The CGW 120 decapsulates the VXLAN encapsulated DHCP discover to retrieve the broadcast DHCP request. The CGW device 120 is configured to transmit the DHCP request as previously described in greater detail with reference to block 250 of FIG. 2.

From block 640, the method 270 returns to block 280 of FIG. 2. In block 280, the DHCP server 152 transmits an DHCP acknowledgement to the host device 140. Block 280 is described in greater detail herein with reference to the method 280 of FIG. 7.

Figure 7:
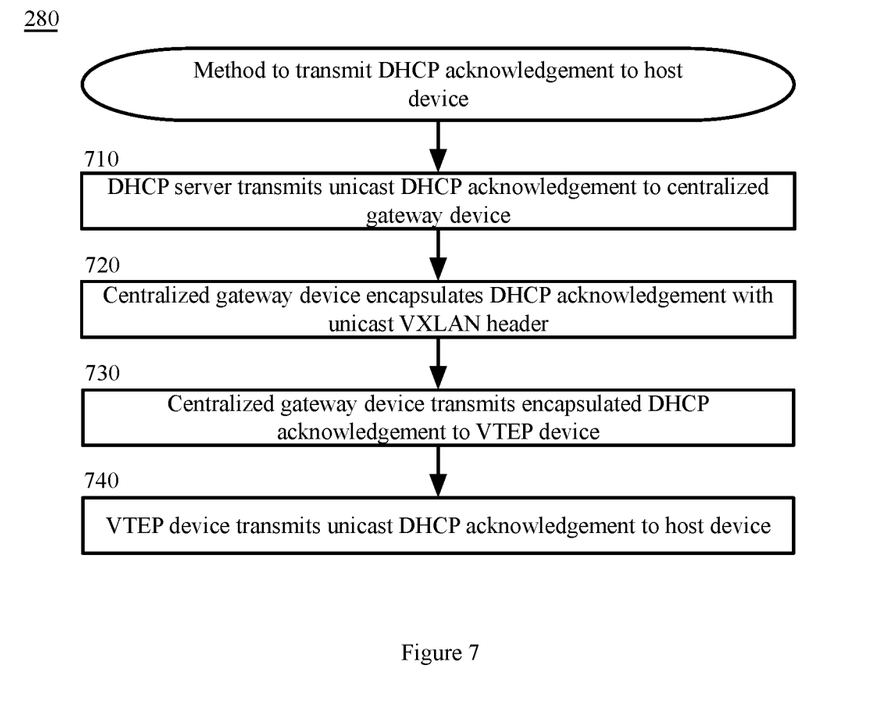
FIG. 7 is a block flow diagram depicting a method to transmit a dynamic host configuration protocol acknowledgement to a host device, in accordance with certain examples.

In block 710, the DHCP server 152 transmits a unicast DHCP acknowledgement to centralized gateway device 120. In response to the receipt of the DHCP request described in reference to method 270 of FIG. 6, the DHCP server 152 generates a DHCP acknowledgement message. The DHCP acknowledgement is the final phase of the configuration process to provide host device 140 with an IP address. In an example, the DHCP acknowledgement includes a lease duration associated with the offered IP address and any other configuration information that the host device 140 may have requested.

In block 720, the centralized gateway device 120 encapsulates the DHCP acknowledgement with a unicast VXLAN header. The DHCP acknowledgement is encapsulated with a unicast VXLAN header comprising an outer MAC header, wherein the outer MAC header is the MAC associated with the VTEP device 130.

In block 730, the centralized gateway device 120 transmits the encapsulated DHCP acknowledgement to the VTEP device 130. The CGW device 120 transmits the encapsulated DHCP acknowledgement to the VTEP device 130 utilizing the MAC address associated with the VTEP device 130.

In block 740, the VTEP device 130 transmits a unicast DHCP acknowledgement to the host device 140. The VTEP device 130 decapsulates the DHCP acknowledgement received from the CGW device 120. The VTEP device 130 transmits the unicast DHCP offer to the MAC address associated with the host device 140 within the DHCP acknowledgement.

After the completion of method 280, the methods described herein conclude until a new DHCP discover is broadcast from a host device 140.

Other Examples

FIG. 8 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method performed at least partly by a Layer 2 (L2) computing device of a network system that has L2 relay functionality, the method comprising:
   receiving, from a host computing device in the network system, a dynamic host configuration protocol (DHCP) discover packet;
   selecting a Layer 3 (L3) computing device, from other computing devices located within the network system, as a destination for the DHCP discover packet based at least in part on the L3 computing device having L3 relay functionality as a destination for the DHCP discover packet, wherein the L3 computing device communicates with a DHCP server;
   transmitting the DHCP discover packet to the L3 computing device;
   receiving, from the L3 computing device, a DHCP offer that includes an IP address for use by the host computing device; and
   sending the DHCP offer to the host computing device.

2. The method of claim 1, further comprising:
   by the L3 computing device:
   receiving, from the L2 computing device, the DHCP discover packet;
   transmitting the packet to the DHCP server that is external to the network system; and
   receiving, from the DHCP server external to the network system, the DHCP offer associated with the packet.

3. The method of claim 1, wherein selecting the L3 computing device comprises:
   determining respective quantities of network traffic to each of the other computing devices; and
   selecting the L3 computing device having a least quantity of network traffic.

4. The method of claim 1, wherein the other computing devices are Layer 3 devices with Layer 3 relay functionality.

5. The method of claim 1, wherein the DHCP discover packet further comprises a request for one or more configuration parameters.

6. The method of claim 1, wherein the DHCP discover packet is broadcast across an Ethernet virtual private network ("EVPN") overlay fabric of the network system.

7. The method of claim 1, wherein transmitting the DHCP discover packet comprises:
- replacing the a destination address associated with the DHCP discover packet with an address of the L3 computing device;
- encapsulating the DHCP discover packet with a unicast Virtual Extensible Local Area Network ("VXLAN") header to generate an encapsulated packet, wherein the VXLAN header comprises an outer MAC header address corresponding to the L3 computing device; and
- transmitting the encapsulated packet to the L3 computing device.

8. The method of claim 1, wherein the L2 computing device is a Virtual Extensible Local Area Network (VXLAN) Tunnel Endpoint (VTEP) leaf switch.

9. The method of claim 8, further comprising refraining, by the VTEP switch, from transmitting the DHCP discover packet to other VTEP leaf switches in the network system.

10. The method of claim 1, further comprising:
- modifying an existing destination media access control (MAC) address of the DHCP packet to be a new destination MAC address associated with the L3 computing device.

11. A computing device located in a network system, comprising:
- one or more processors; and
- a non-transitory computer-readable medium having computer-readable program instructions embodied thereon that, when executed by the one or more processors, cause the computing device to:
  - receive, from a host computing device in the network system, a dynamic host configuration protocol (DHCP) discover packet;
  - select a Layer 3 (L3) computing device, from other computing devices located within the network system, as a destination for the DHCP discover packet based at least in part on the L3 computing device having L3 relay functionality as a destination for the DHCP discover packet, wherein the L3 computing device communicates with a DHCP server;
  - transmit the DHCP discover packet to the L3 computing device;
  - receive, from the L3 computing device, a DHCP offer that includes an IP address for use by the host computing device; and
  - send the DHCP offer to the host computing device.

12. The computing device of claim 11, wherein selecting the L3 computing device comprises:
- determine respective quantities of network traffic to each of the other computing devices; and
- select the L3 computing device having a least quantity of network traffic.

13. The computing device of claim 11, wherein the DHCP discover packet is broadcast across an Ethernet virtual private network ("EVPN") overlay fabric of the network system.

14. The computing device of claim 11, wherein transmitting the DHCP discover packet comprises:
- replace the a destination address associated with the DHCP discover packet with an address of the L3 computing device;
- encapsulate the DHCP discover packet with a unicast Virtual Extensible Local Area Network ("VXLAN") header to generate an encapsulated packet, wherein the VXLAN header comprises an outer MAC header address corresponding to the L3 computing device; and
- transmit the encapsulated packet to the L3 computing device.

15. A system, comprising:
- a storage device; and
- a processor communicatively coupled to the storage device, wherein the processor executes application code instructions that are stored in the storage device to cause the system to:
  - receive, from a host computing device in a network system, a dynamic host configuration protocol (DHCP) discover packet;
  - select a Layer 3 (L3) computing device, from other computing devices located within the network system, as a destination for the DHCP discover packet based at least in part on the L3 computing device having L3 relay functionality as a destination for the DHCP discover packet, wherein the L3 computing device communicates with a DHCP server;
  - transmit the DHCP discover packet to the L3 computing device;
  - receive, from the L3 computing device, a DHCP offer that includes an IP address for use by the host computing device; and
  - send the DHCP offer to the host computing device.

16. The system of claim 15, wherein selecting the L3 computing device comprises:
- determine respective quantities of network traffic to each of the other computing devices; and
- select the L3 computing device having a least quantity of network traffic.

* * * * *